United States Patent [19]

Rudick

[11] Patent Number: 4,676,370

[45] Date of Patent: Jun. 30, 1987

[54] LOCKING MECHANISM FOR A REEL STORAGE CONTAINER

[75] Inventor: Arthur G. Rudick, Marietta, Ga.

[73] Assignee: Eastman Kodak Company, Rochester, N.Y.

[21] Appl. No.: 776,073

[22] Filed: Sep. 13, 1985

[51] Int. Cl.[4] ............................................. A45C 13/10
[52] U.S. Cl. .................................... 206/1.5; 206/404;
206/405; 206/406; 70/63; 292/302; 292/303;
220/302
[58] Field of Search ................ 206/1.5, 403, 404, 405,
206/406, 444; 292/163, 175, 302, 303; 70/63,
170, 171, 173; 220/301, 302; 215/216, 356;
242/55.53

[56] References Cited

U.S. PATENT DOCUMENTS

| | | | |
|---|---|---|---|
| 3,407,923 | 10/1968 | Mathus | 206/52 |
| 3,498,447 | 3/1970 | Edwards | 206/52 |
| 3,504,652 | 4/1970 | Norman, Jr. | 206/405 |
| 3,552,551 | 1/1971 | Goldberg et al. | 206/403 |
| 3,700,098 | 10/1972 | Posso | 206/406 |
| 3,862,555 | 1/1975 | Wirth | 70/63 |
| 3,882,701 | 5/1975 | Wirth | 70/63 |
| 4,069,942 | 1/1978 | Marshall et al. | 215/216 |
| 4,083,449 | 4/1978 | Rubbins | 206/405 |
| 4,101,030 | 7/1978 | Kroeber | 206/403 |
| 4,144,983 | 3/1979 | Pauls et al. | 215/216 |
| 4,427,124 | 1/1984 | Marshall et al. | 215/216 |
| 4,520,921 | 1/1985 | Vissing | 206/1.5 |

FOREIGN PATENT DOCUMENTS

| | | | |
|---|---|---|---|
| 700552 | 12/1964 | Canada | 206/403 |
| 765670 | 8/1967 | Canada | 206/403 |
| 2410827 | 9/1975 | Fed. Rep. of Germany . | |
| 2726098 | 12/1978 | Fed. Rep. of Germany | 206/403 |
| 1520838 | 4/1968 | France . | |

Primary Examiner—Stephen Marcus
Assistant Examiner—David T. Fidei
Attorney, Agent, or Firm—William C. Dixon

[57] ABSTRACT

A locking mechanism is disclosed for releasably coupling together cover and receptacle portions of a reel storage container. The cover portion has a rotatably mounted, single-part hub member which is manually movable relative thereto between at least "open" and "closed" positions. The receptacle portion has a cam member engageable by a cam follower on the cover portion when the hub member is moved to its "closed" position to draw the cover and receptacle portions into tightly closed engagement. The hub member further has a spring latch arm that is an integral part of the hub member and is manually movable relative thereto between normal latched position in which the hub member and cover portion are latched together, and an unlatched position.

4 Claims, 5 Drawing Figures

LOCKING MECHANISM FOR A REEL STORAGE CONTAINER

BACKGROUND OF THE INVENTION

1. Field of the Invention

This invention relates generally to reel storage containers, and more specifically to a locking mechanism for releasably coupling together cover and receptacle portions of a reel storage container.

2. Description of the Prior Art

The prior art is replete with patents disclosing locking mechanisms for reel storage containers, of which U.S. Pat. Nos. 3,297,153, Fattori; 3,754,421, Wirth; 3,863,762, Arai; and 4,320,834, Tamaki; are exemplary.

In what is believed to be non-analagous prior art, U.S. Pat. No. 3,841,674, Bisbing et al. discloses a unitary sliding-action latch for securing a door panel, especially a hinged door panel, in a closed position.

SUMMARY OF THE INVENTION

In accordance with a preferred embodiment of the invention, a locking mechanism is disclosed for releasably coupling together cover and receptacle portions of a reel storage container. The locking mechanism comprises a manually movable single-part hub member rotatably mounted on the cover portion for movement between at least "open" and "closed" positions. The receptacle portion has a cam member defining a ramp surface engageable by a cam follower on the hub member. The cover and receptacle portions can be assembled into a loosely closed relationship when the hub member is in its "open" position. When the hub member is moved to its "closed" position, the cam follower slides on the ramp surface drawing the cover and receptacle portions into tightly closed engagement. The hub member further has detent means between the hub member and cover portion comprising a spring latch arm formed as an integral part of the hub member. The latch arm is manually movable relative to the cover portion between a normal latched position in which the hub member and cover portion are latched together, and an unlatched position in which the hub member is unlatched from the cover portion.

In a more specific aspect of the invention, the hub member comprises (1) a cylindrical body portion rotatably mounted on the cover portion, (2) an enlarged cylindrical cup-shaped end portion having a base perpendicular to the axis of the hub member, and a coaxial annular peripheral rim integral with the base and axially extending from one side surface thereof, and (3) radially extending cam followers at the opposite end portion of the hub member. The spring latch arm of the hub member comprises an arcuate segment of the annular rim defined by a continuous slot extending through the base and annular rim. The arcuate spring arm has an end portion integral with the rim, and an opposite free end portion having a base segment integral therewith. The base segment has a manually engageable upstanding finger for manual movement of the spring arm between its latched and unlatched positions.

In a more specific aspect of the invention, the base segment has an offset pin extending axially from the opposite side of the base. The cover portion has a coaxial circular axially extending shoulder having first, second and third notches therein engageable by the pin for releasably holding the hub member in "open", "closed", and "locked" positions respectively. The first and second notches are V-shaped for releasably holding the pin in the "open" and "closed" positions respectively. the third notch has radially extending leading and trailing stop surfaces having facing V-shaped grooves for receiving and preventing movement of the pin when the hub member is in its "locked" position.

A primary advantage of this invention is to provide an improved locking mechanism for a reel storage container that is of simple design and construction in which only a few parts are involved, none of which have to be held to close tolerances. Also, the locking mechanism is thoroughly reliable and efficient in operation, and economical to manufacture.

The invention and its advantages will become more apparent from the detailed description of the invention presented below.

BRIEF DESCRIPTION OF THE DRAWINGS

In the detailed description of the invention presented below, reference is made to the accompanying drawings, in which:

FIG. 4 is an enlarged segmental top plan view of the central portion of the reel storage container of FIG. 1 with the hub member of the locking mechanism removed.

DETAILED DESCRIPTION OF THE INVENTION

Figure 1:
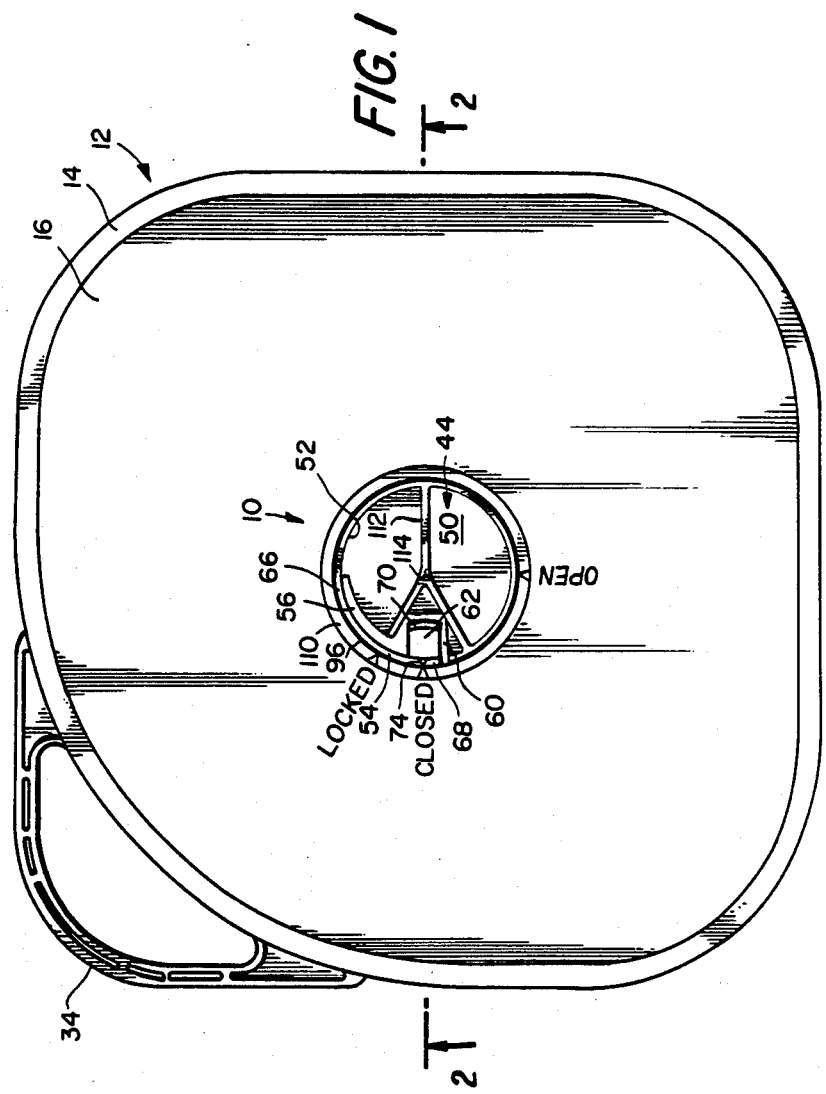
FIG. 1 is a top plan view of a preferred embodiment of the locking mechanism of this invention incorporated in a reel storage container and showing the hub member in its "closed" position.
Figure 2:
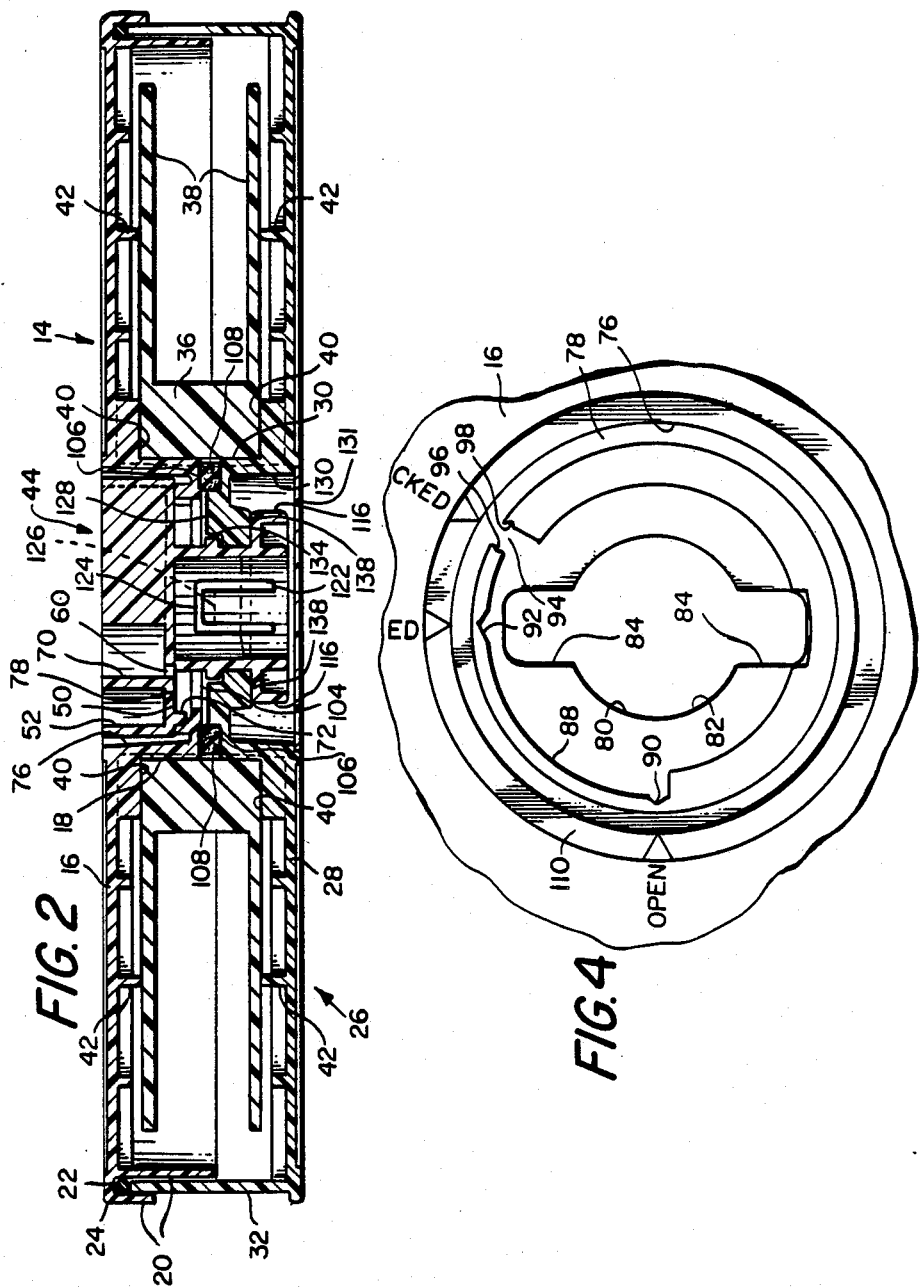
FIG. 2 is a section view taken substantially along line 2—2 of FIG. 1.

Referring now to FIGS. 1 and 2 of the drawings, a preferred embodiment of the locking mechanism 10 of this invention is shown incorporated in a reel storage container 12. The container (FIG. 2) comprises a cover portion 14 having a flat plate 16, a central cylindrical boss 18 depending from the plate, and spaced walls 20 depending from the plate at the periphery thereof to form a groove 22 for receiving a resilient seal, such as an O-ring 24, for example. The container 12 further comprises a receptacle portion 26 having a flat plate 28, a central cylindrical boss 30 upstanding from the plate, and a wall 32 upstanding from the plate at the periphery thereof. Wall 32 is insertable in groove 22 when the container is closed by mounting the cover 14 on the receptacle 26. A handle 34 (FIG. 1) for container 12 is integrally formed on a corner of wall 32.

In the closed position of container 12, the aligned central bosses 18, 30 form a core for supporting a reel 36 of tape, not shown. When container 12 is locked, clock-springing of reel 36 is prevented by (1) friction between the outer surface of the core and the inner surface of the reel mounted thereon, (2) friction between outer surfaces of reel flanges 38 and the outer surfaces of ribs 40 projecting from flat plates 16, 28 and extending radially from the bosses 18, 30, and (3) friction between circular ribs 42 laterally extending from the inner surfaces of the flat plates 16, 28.

The locking mechanism 10 for releasably locking the cover and receptacle portions 14, 26 respectively together, will now be described with reference to FIGS. 1-3. The locking mechanism 10 comprises a single-part hub member 44 having a tubular body member 46 provided at one end with an enlarged cylindrical, cup-shaped handle-latch member 48. The handle-latch member has a circular base 50 perpendicular to the axis of body 46, and an annular peripheral rim 52 integral with the base and axially extending from one side surface thereof.

Figure 3:
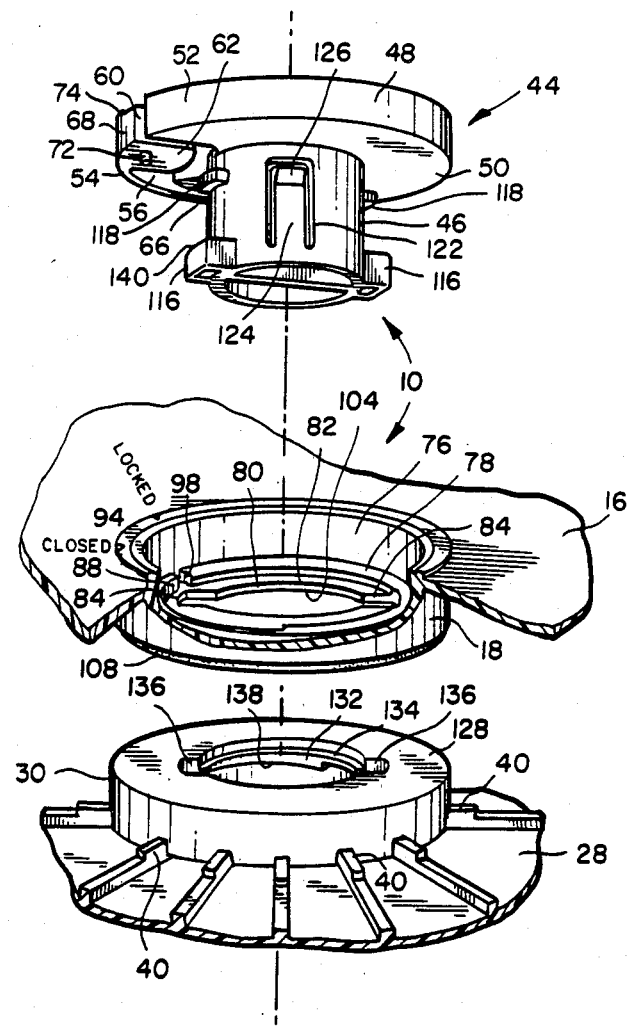
FIG. 3 is an exploded perspective view of the locking mechanism of this invention.

Cover portion 14 and hub member 44 have an engagement means comprising a spring latch arm 54 on hub member 44 latch arm 54 is defined as best seen in FIG. 3 by a continuous irregular slot extending through base 50. The slot has a blind portion 56 adjacent to an annular portion of rim 52, and another portion 60 defining a base segment 62, and passing through rim 52. One end 66 of spring latch arm 54 forms an integral part of rim 52, and its opposite end 68 is free for pivotal movement about end 66. An arcuate upstanding finger 70 (FIG. 1) is integral with base segment 62 to form a handle by which latch arm 54 may be pivotally moved from a normal latched position, in which hub member 44 is latched to cover portion 14, to an unlatched position, shown in FIG. 5. The opposite side of base segment 62 has a depending pin 72 which is in alignment with a V-shaped indicium 74 on the upper surface of free end portion 68 of arm 54.

The aforementioned cylindrical boss 18 on cover portion 14 is cup-shaped, having an upper circular cavity 76 and lower wall 78, as best seen in FIG. 3. The lower wall has a central opening 80 defining a circular shoulder 82 and diametrically opposed, peripheral slots 84, as best seen in FIG. 4. The upper surface of wall 78 has an arcuate upstanding latch shoulder 88 having a first V-shaped notch 90 contiguous to one end of shoulder 88 forming a stop surface. A second V-shaped notch 92 is provided in shoulder 88 angularly spaced approximately 90 degrees from notch 90. A third notch 94 is located at the other end of shoulder 88 having radially extending leading and trailing V-shaped stop surfaces 96, 98. The lower surface of wall 78, as best seen in FIG. 2, has a shelf 104 and a circular peripheral recess 106 into which an annular resilient ring 108 is secured by any suitable means.

As best seen in FIG. 4, a rim 110 of the cover plate surrounding upper cavity 76 is provided with V-shaped indicia marked "open," "closed" and "locked" in alignment with first, second and third notches 90, 92, 94 respectively.

Base 50 is further provided with an axially extending, manually engageable rib handle 112 (FIG. 1) having one end integral with rim 52, and an opposite bifurcated end 114 partially surrounding finger 70 for preventing inadvertent engagement and movement of the finger and spring latch arm 54 to its unlatched position. The rib handle 112 provides a means for rotatably moving hub member 44 between the "open", "closed" and "locked" positions.

The hub member 44 (FIG. 3) further has diametrically opposed, radially extending cam followers 116 at the opposite end of body member 46. The body member also has diametrically opposed, radially extending stop lugs 118, and angularly spaced therebetween, diametrically opposed, radially movable detents, only one of which is shown, defined by U-shaped slots 122. The slots extend through tubular body 46 to form spring arms 124 having radially extending bevelled lips 126 at the free ends thereof. The function of the lugs 118 and lips 126 will be described hereinafter.

With reference to FIGS. 2 and 3, boss 30 is an inverted cylindrical cup-shaped member having an upper wall 128 and a lower circular cavity 130 closed off by a circular plate 131 secured to boss 30 by any suitable means. The upper wall has a central opening 132 defining a circular shoulder 134 and diametrically opposed, peripheral slots 136 for receiving hub body portion 46 and cam followers 116 when cover portion 14 is mounted on receptacle portion 26. Shoulder 134 (FIG. 3) further has cam members, such as lower ramp surfaces 138 surrounding opening 132 which are slidably engaged by a tapered surface 140 on cam followers 116 when hub member 44 is moved from its "open" position to the "closed" or "locked" positions. Movement of cam followers 116 on ramp surfaces 138 pulls the cover and receptacle portions 14, 16 respectively of container 12 tightly together to grip reel 36 therebetween for handling and/or shipping.

The hub member 44 is rotatably mounted on cover portion 14 by initially aligning cam followers 116 with slots 84 and arm indicium 74 with the "closed" indicia, as seen in FIG. 1. The hub member 44 is lowered causing body portion 46 to enter central opening 80, and cam followers 116 to pass through slots 84. Depression of hub member 44 downwardly into its mounted position causes bevelled lips 126 of the detents to move radially inwardly and then to spring out when the lips pass through opening 80 to move in the path of shelf 104 (FIG. 1). and prevent removal of the hub member from cover portion 14.

To assemble or separate the cover and receptacle portions 14, 26 respectively, hub member 44 is rotated by rib handle 112 until indicium 74 is in alignment with the "open" indicium. The cover portion 14 is mountable on receptacle portion 26 in only one position by virtue of the non-symmetrical interengaging walls, 20, 32. In this position, hub body portion 46 and cam followers 116 pass through central opening 132 and slots 136 in boss 30 for mounting or removal of cover portion 14 onto or from receptacle portion 26. Also, pin 72 nests in first notch 90 due to the resilience of spring latch arm 54.

After the cover and receptacle portions 14, 26 respectively of container 12, are assembled with or without a reel 36 mounted therein, hub member 44 is manually moved by rib handle 112 from the "open" position to the "closed" position to move the cover and receptacle into tightly closed engagement. During this movement (see FIG. 4), pin 72 slides out of first notch 90, slides along shoulder 88 and nests in second notch 92 where it is releasably held by the resilience of spring latch arm 54. Also, cam followers 140 slide on ramp surfaces 138 causing cover and receptacle portions 14, 26 respectively to be pulled together compressing resilient ring 108 and clamping reel 36 between ribs 40, 42, if one is present. If it is desired to ship container 12 by mail, for example, the hub member 44 is moved by rib handle 112 to the "locked" position where pin 72 is trapped in third notch 94. In this position, container 12 is locked and any attempt to move hub member 44 in either direction is blocked by pin 72 engaging V-shaped stop surfaces 96, 98 of notch 94.

Figure 5:
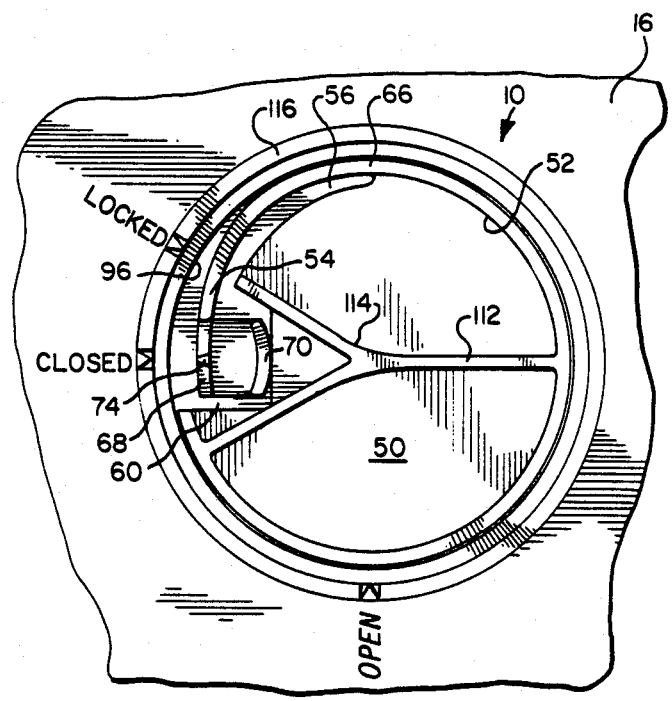
FIG. 5 is an enlarged segmental top plan view of the locking mechanism of FIG. 1 showing the spring latch arm in its unlatched position.

To open container 12 at its destination, finger 70 (FIG. 1) is engaged and moved inwardly into the position seen in FIG. 5, withdrawing pin 72 from notch 94 to unlatch hub member 44 from cover portion 14. Hub member 44 is then manually moved by rib handle 112 to its "open" position aligning cam followers 116 with slots 136 to allow cover portion 14 to be removed from receptacle portion 26.

The invention has been described in detail with particular reference to preferred embodiments thereof, but it will be understood that variations and modifications can be effected within the spirit and scope of the invention.

What is claimed is:

1. A locking mechanism for releasably coupling together cover and receptacle portions of a reel storage container, said mechanism comprising:

a manually movable single-part hub member adapted to be mounted on said cover portion for movement relative thereto between "open" and "closed" positions, said hub member having a cam follower;

a cam member defining a ramp surface on said receptacle portion which is out of engagement with said cam follower when said hub member is in said "open" position, to allow positioning said cover and receptacle portions in loosely closed relationship, and is in sliding engagement with said cam follower when said hub member is moved to said "closed" position, to draw said cover and receptacle portions into tightly closed engagement; and engagement means for said hub member and said cover portion, said engagement means including a manually movable spring latch arm formed as an integral part of said hub member and movable between a normal latched position, in which said hub member and said cover portion are releasably latched together in said "open" and "closed" positions, and an unlatched position;

said hub member having a circular end portion, and said spring latch arm being arcuate-shaped and having one end thereof integral with said end portion and an opposite end thereof free for manual movement between said latched and unlatched positions;

said circular end portion being cup-shaped, with a base and a peripheral annular rim projecting therefrom, and said latch arm being defined by a continuous slot extending through said base and said annular rim such that said latch arm has one end portion which is an integral part of said annular rim and an opposite end portion which is free for manual movement between said latched and unlatched positions;

said free end portion having a base segment integral therewith and a manually engageable finger by which said latch arm is movable to said unlatched position;

said circular end portion base having a manually engageable rib integral therewith and upstanding therefrom, by which said hub member is manually movable between said "open" and "closed" positions; and said rib having a bifurcated end portion partially surrounding said finger for preventing inadvertent movement of said latch arm to said unlatched position.

2. A locking mechanism for releasably coupling together cover and receptacle portions of a reel storage container, said mechanism comprising:

a manually movable single-part hub member adapted to be mounted on said cover portion for movement relative thereto between "open" and "closed" positions, said hub member having a cam follower;

a cam member defining a ramp surface on said receptacle portion which is out of engagement with said cam follower when said hub member is in said "open" position, to allow positioning said cover and receptacle portions in loosely closed relationship, and is in sliding engagement with said cam follower when said hub member is moved to said "closed" position, to draw said cover and receptacle portions into tightly closed engagement; and engagement means for said hub member and said cover portion, said engagement means including a manually movable spring latch arm formed as an integral part of said hub member and movable between a normal latched position, in which said hub member and said cover portion are releasably latched together in said "open" and "closed" positions, and an unlatched position;

said hub member including (1) a cylindrical body portion rotatably mounted on said cover portion, (2) an enlarged cup-shaped end portion of said body portion having a base perpendicular to the axis of said hub member and a peripheral annular rim integral with said base and axially extending from one side surface thereof, and (3) radially extending cam followers at the opposite end portion of said body portion; and said spring latch arm including an arcuate segment of said annular rim defined by a continuous slot extending through said base and said annular rim such that said latch arm has one end portion which is an integral part of said annular rim and an opposite end portion which is free for manual movement between said latched and unlatched positions;

said free end portion having a base segment integral therewith and a manually engageable finger, integral with and upstanding from one side of said base segment, by which said latch arm is movable to said unlatched position;

said engagement means further including a pin on said base segment, extending axially from the opposite side thereof, and a circular axially extending shoulder on said cover portion having first and second angularly spaced notches engageable by said pin for releasably holding said hub member in said "open" and "closed" positions respectively;

said hub member also being movable past said "closed" position to a "locked" position, at which said pin is capturable in a third notch in said cover portion to prevent movement of said hub member, said pin being releasable upon manual movement of said latch arm to said unlatched position;

said first notch being V-shaped and said shoulder having a first stop surface, contiguous to said first notch, which is engageable by said pin when said hub member is in said "open" position; said second notch also being V-shaped, for releasably holding said pin in said "closed" position; and said third notch having radially extending leading and trailing stop surfaces between which said pin is capturable for holding said hub member in said "locked" position; and said leading and trailing stop surfaces having facing V-shaped grooves for receiving, and preventing angular movement of, said pin when said hub member is in said "locked" position and said latch arm is in said latched position.

3. A locking mechanism according to claim 2 wherein said base has a manually engageable rib handle integral therewith and upstanding therefrom, by which said hub member is movable between said "open" and "closed" positions.

4. A locking mechanism according to claim 3 wherein said rib handle has a bifurcated end portion partially surrounding said finger for preventing inadvertent movement of said latch arm to said unlatched position.

* * * * *